K. HAWKINS.
BEEHIVE FRAME WIRING DEVICE.
APPLICATION FILED MAR. 29, 1920.
1,373,131.
Patented Mar. 29, 1921.
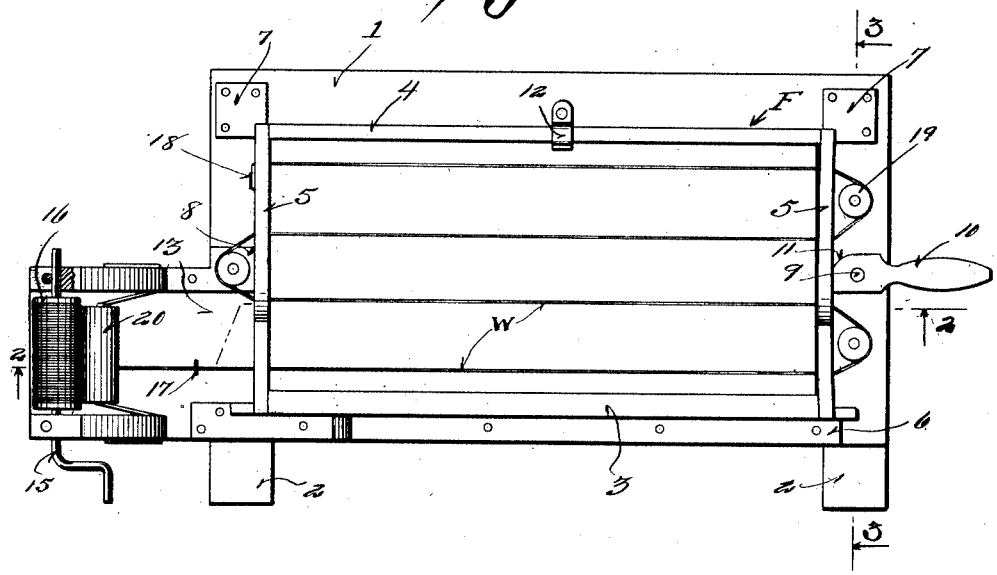
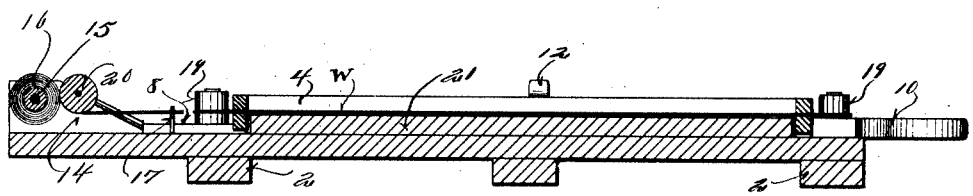
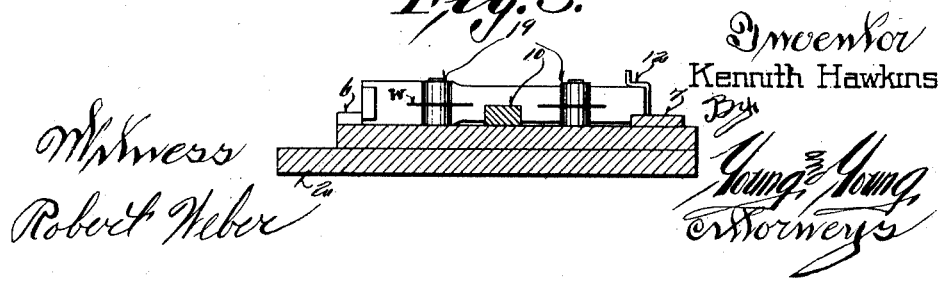
Inventor
Kenneth Hawkins
Witness
Robert Weber
By
Young & Young
Attorneys

UNITED STATES PATENT OFFICE.

KENNITH HAWKINS, OF WATERTOWN, WISCONSIN, ASSIGNOR TO G. B. LEWIS COMPANY, OF WATERTOWN, WISCONSIN.

BEEHIVE-FRAME-WIRING DEVICE.

1,373,131.  Specification of Letters Patent.  Patented Mar. 29, 1921.

Application filed March 29, 1920. Serial No. 369,530.

*To all whom it may concern:*

Be it known that I, KENNITH HAWKINS, a citizen of the United States, and resident of Watertown, in the county of Jefferson and State of Wisconsin, have invented certain new and useful Improvements in Beehive-Frame-Wiring Devices; and I do hereby declare that the following is a full, clear, and exact description thereof.

My invention relates to improvements for stringing wires or the like across frames, and is more particularly adapted for wiring bee hive brood frames.

Brood frames of bee hives usually carry a comb foundation held therein by means of a plurality of wires which connect the opposite ends of the frames. As such frames are at present constructed, there is a tendency of the wires and the brood combs to sag with the result that there is less room in the hive with the consequent decrease in honey production and an increase in swarming. It is therefore the principal object of this invention to provide an arrangement whereby the supporting wires of brood frames may be tensioned to such an extent that a possibility of sagging is obviated.

An additional object of the invention is to provide means in connection with the wiring device whereby a bee comb foundation may be secured on the wires of a frame without removing the latter from the wiring device.

With these and other objects in view the invention consists in the novel features of construction, combination and arrangement of parts which will be hereinafter more particularly described and claimed and shown in the accompanying drawing, wherein:

Figure 1 represents a plan view of a frame wiring device constructed in accordance with my invention and having a frame disposed thereon and shown in the process of being wired.

Fig. 2 is a longitudinal sectional view taken on the plane of the line 2—2 of Fig. 1, and Fig. 3 is a transverse sectional view on the plane of the line 3—3 of Fig. 1.

In the illustrated embodiment of the invention, the reference character 1 denotes a substantially rectangular base having attaching portions 2 for securing the same to a suitable support, and means for seating a rectangular brood frame F while the same is being wired. This frame consists of a relatively rigid top bar 3, a flexible bottom bar 4 and similar end bars 5, such a frame being suspended in a bee hive by means of the top bar 3 and the projecting ends thereof.

When in position on the base 1, the frame F has its top bar 3 engaged throughout its length with a strip 6, its bottom corners being in contact with corner stops 7, and one end bar 5 with an intermediate end stop 8. At the opposite end of the base 1 from the stop 8 and substantially alined therewith is a pivot 9 on which is mounted a cam lever 10, the cam 11 of which is adapted to be engaged with one end bar 5 when the lever is rotated in the proper direction. During the engagement of the cam 11 with one end bar of the frame F, both of the end bars 5 are bowed inwardly toward each other and are held in this position until the frame is wired. At the same time the bottom bar 4 is bowed inwardly by means of a hinged clip 12 pivoted to the base 1 and swung into engagement with the intermediate portions of the bottom bar 4 when the frame F is being operated upon.

At the same end of the base 1 of the device as the intermediate end stop 8 is an extension 13 which carries a pair of bearings 14 having a shaft 15 of a wire carrying reel 16 mounted therein. The wire W of this reel is adapted to form strands connecting the end bars 5 of the frame, and in applying the same is first threaded through an eye 17 on the extension 13 and then extended through coöperating apertures in the end bars 5 adjacent the top bar 3. Both of these end bars 5 are provided with a series of such wire receiving apertures from adjacent the top bar 3 to adjacent the lower or bottom bar 4, the free end of the wire being secured to one of the end bars adjacent the said bottom bar as at 18.

It will be noticed that these portions of wire W which are located exteriorly of the frame F are disposed around rollers 19 carried by the base 1. The base also has mounted thereon a guide and tension roller 20 which engages the reel 16 and the portion of the wire W there adjacent. After the part of the wire from the reel which is to form strands connecting the end bars 5 of the frame is arranged as shown in Fig.

1, the same is tensioned by winding up on the reel and successively disengaging the portions of the wire from the rollers 19. After the several strands of wire within the frame F are taut, that portion of the wire between the eye 17 and the adjacent end bar 5 is secured to the latter after being severed from the supply on the reel 16.

The completely wired frame may now be removed from the device by swinging the cam lever 10 out of engagement with the adjacent end bar 5 and moving the hinged clip 12. It is obvious that since pressure is relieved from the different parts of the frame, the natural resiliency thereof will straighten out the end bars 5 and bottom bar 4 to their normal positions. The consequent result of this is a further tensioning of the strands of wire W until they are so taut that sagging thereof when supporting a brood comb is practically impossible.

As shown in Figs. 2 and 3 the apertures in the end bars 5 through which the wire W extends are substantially mid-way between the outer side edges of the frame, and the strands of wire are likewise so positioned. Therefore I provide on the base 1, a platform 21 of slightly smaller size than the inner area of the frame F so that a bee comb foundation may be secured upon the wire W without removing the frame F from the wiring device. This obviously saves time and eliminates the necessity for a second device for use in applying the comb foundations.

Various minor changes may be made in the form and proportions of the several parts of the invention without departing from the principles thereof, or sacrificing any of the advantages as hereinbefore noted.

I claim:

1. In a device of the class described, a frame holder adapted to receive a frame having substantially flexible ends, a cam lever mounted on the frame holder and adapted to have its cam portion moved into engagement with one end of the frame positively bowing the same, and means for connecting the ends of the frame with strands of wire or the like.

2. In a device of the class described, a frame holder adapted to receive a frame having substantially flexible ends, a stop fixed to the frame holder to engage one end of the frame, a cam lever carried by the holder and adapted to have its cam portion moved into engagement with the other end of the frame to positively bow said ends inwardly toward each other, and means for connecting the bowed ends of the frame with strands of wire or the like.

3. In a device of the class described, a frame holder adapted to receive a frame, means for stretching strands of wire or the like between the opposite end bars of the frame, said strands being substantially midway between the opposite outer side edges of said end bars, and a platform carried by the holder and adapted to be received within the frame, said platform being substantially half the thickness of the frame to form a support for a bee comb foundation or the like while being secured to said strands.

In testimony that I claim the foregoing I have hereunto set my hand at Watertown, in the county of Jefferson and State of Wisconsin.

KENNITH HAWKINS.